US010601809B2

(12) United States Patent
Koster (10) Patent No.: US 10,601,809 B2
(45) Date of Patent: Mar. 24, 2020

(54) SYSTEM AND METHOD FOR PROVIDING A CERTIFICATE BY WAY OF A BROWSER EXTENSION (71) Applicant: ARRIS Enterprises LLC, Suwanee, GA (US)

(72) Inventor: Kevin Lee Koster, Westminster, CO (US)

(73) Assignee: ARRIS Enterprises LLC, Suwanee, GA (US)

(*) Notice: Subject to any disclaimer, the term of this patent is extended or adjusted under 35 U.S.C. 154(b) by 622 days.

(21) Appl. No.: 14/824,328

(22) Filed: Aug. 12, 2015

(65) Prior Publication Data
US 2016/0212123 A1 Jul. 21, 2016

Related U.S. Application Data (60) Provisional application No. 62/105,630, filed on Jan. 20, 2015.

(51) Int. Cl.
H04L 29/06 (2006.01)

(52) U.S. Cl.
CPC ........ H04L 63/0823 (2013.01); H04L 63/083 (2013.01)

(58) Field of Classification Search
CPC .................. H04L 63/0823; H04L 63/083
USPC ........................................ 713/156
See application file for complete search history.

(56) References Cited

U.S. PATENT DOCUMENTS

| 7,249,375 | B2 | 7/2007 | Bhatia et al. |
| 7,353,383 | B2 | 4/2008 | Skingle |
| 7,428,750 | B1 | 9/2008 | Dunn et al. |
| 7,788,493 | B2 | 8/2010 | Mononen et al. |
| 7,913,298 | B2 | 3/2011 | Bhatia et al. |
| 7,953,979 | B2 | 5/2011 | Borneman et al. |
| 9,787,521 | B1* | 10/2017 | Boynes ............ H04L 29/06326 |
| 2002/0144119 | A1 | 10/2002 | Benantar |
| 2004/0015725 | A1* | 1/2004 | Boneh .................. H04L 63/166 713/160 |
| 2006/0080352 | A1 | 4/2006 | Boubez et al. |
| 2006/0094403 | A1 | 5/2006 | Norefors et al. |
| 2008/0072301 | A1 | 3/2008 | Chia et al. |
| 2008/0263629 | A1 | 10/2008 | Anderson |
| 2009/0037729 | A1 | 2/2009 | Smith et al. |
| 2009/0100263 | A1* | 4/2009 | Leonard ................. H04L 63/20 713/156 |

(Continued)

Primary Examiner — Teshome Hailu
(74) Attorney, Agent, or Firm — Stewart M. Wiener; Steven E. Stupp (57) ABSTRACT Provided is a system and method for providing a certificate by way of a Browser Extension. More specifically, provided is a Server System having at least one processor adapted to provide web pages to Browsers of user devices, the Server System further adapted to include at least one pattern and at least one identifier in at least one web page provided to a user device, the Server System further structured and arranged to receive from a Browser extension upon a user's device that has recognized the pattern and extracted the identifier a certificate request (CSR) and the extracted identifier, and upon verification of the identifier and the CSR, generating a certificate based at least in part on the CSR and returning the certificate to the Browser extension for installation upon the user device. An associated method is also provided.

54 Claims, 4 Drawing Sheets

(56) References Cited

U.S. PATENT DOCUMENTS

| | | |
|---|---|---|
| 2009/0172776 A1 | 7/2009 | Makagon et al. |
| 2009/0268912 A1* | 10/2009 | Nakae .................. H04L 9/3213 380/270 |
| 2009/0271409 A1 | 10/2009 | Gosh |
| 2010/0077208 A1 | 3/2010 | Appiah et al. |
| 2010/0247055 A1 | 9/2010 | Arashitani et al. |
| 2012/0023568 A1 | 1/2012 | Cha et al. |
| 2012/0072979 A1 | 3/2012 | Cha et al. |
| 2013/0103833 A1 | 4/2013 | Ringland et al. |
| 2015/0372813 A1* | 12/2015 | Brand .................. H04L 9/0841 713/156 |

\* cited by examiner

SYSTEM AND METHOD FOR PROVIDING A CERTIFICATE BY WAY OF A BROWSER EXTENSION

CROSS REFERENCE TO RELATED APPLICATIONS

This application claims the benefit under 35 U.S.C. § 119(e) of U.S. Provisional Application No. 62/105,630 filed Jan. 20, 2015 the disclosure of which is incorporated herein by reference.

FIELD OF THE INVENTION

The present invention relates generally to systems and methods for establishing authentication of users of computer networks, and more specifically to systems and methods for issuing digital certificates to users of secured networks, the certificates identifying the users and also controlling, at least in part, the scope of network access afforded to the user.

BACKGROUND

In the physical world, individual persons are able to assess one another by sight, hearing and an accounting of physical attributes. Drivers' licenses, passports and other regulated documents provide verified accountings of attributes that permit individuals to validate who they are, or for others to validate who an individual says he or she is.

Fingerprints, retinal pattern, breath and DNA among other attributes are understood and recognized to be highly individualistic and are widely accepted and used to verify identity. But these attributes are physical and tied to a physical world.

Computers have become commonplace and highly integrated in nearly all aspects of modern life—transcending the bounds of professional and social spaces, computers are a prominent fixture in the workplace, in the home, as mobile devices and in many other places and arenas of daily life and modern existence.

Increasingly individuals are representing themselves in the cyber world of computer systems and computer networks, where digital information in the elemental form of binary data is entirely ignorant of physicality. A critical problem in cyberspace is knowing with whom you are dealing—in short, at the present time there is no precise way to determine the identity of a person in digital space. Friends, families, colleagues may use a common computer, share passwords, or even pretend to be people they are not. Sometimes these actions are benign—sometimes they are not.

Traditionally, different systems establish individualized, but similar signup and login procedures to collect information directly from users to establish user identities, passwords and other information in the effort to establish at least a notion of an identity for a user.

A typical person over the age of ten in a modern household with access to computer resources may have a number of user accounts, each with a user name and password as well as perhaps additional security measures such as pin numbers, security images, test questions, and the like.

But the redundancy of such systems, especially where use of a system is occasional or only desired for a brief interaction leads to many problems. Users struggling to remember passwords default to the use of simple phrase, such as "password", "opensaysme", "abcdgoldfish", "0p3n4m3" or other simplistic phrases that are easily compromised.

Although advances in data storage have increased dramatically in recent years there are still costs involved in archiving data—and establishing a user account and maintaining the data records for such an account may be costly for a system where the a high percentage of users never return.

Indeed, in some cases when a user is faced with forgetting his or her prior login information or being unsure if he or she even has an existing identity, the user may opt to create a new identity rather than try and recover the old identity—an action that further leads to increases in archived data, increased storage requirements, potential maintenance issues, and of course costs in terms of time, energy and money.

As computers are often used in a commercial setting such as a business, organization or secured network (hereinafter "business"), there are often very legitimate desires by that business to know who is accessing their network. In addition, in many instances it is highly desired by a business or organization to not only know who is using their system, but also to control the type of equipment that is used with their system.

For example, to comply with licensing, privacy or other external or internal regulation, a company may desire for its users to make use of provided equipment for conducting company business. In other words a new or existing employee is provided with a company system that may have customized software for word processing, email, network access etc. . . . .

In addition, in some instances the different levels of employees may impose different requirements—i.e., a secretary may have email access to the multiple accounts for the persons he or she supports, a vice president or president may have access rights to an entire team, and a mail room person may have access to email and a company directory, but no file access.

Typically, companies permit varying granularity of configuration by individualized configuration—i.e., the system for a given employee must be either pre-configured and given the employee, or the employee must go to the tech resources group and receive his or her new machine.

In addition, in many instances companies or other entities make use of user identities, passwords and even digital certificates in an effort to gate control who has access to what, when, and perhaps from where.

Digital certificates, also known as public key certificates, are electronic documents that bind a digital signature (a mathematical schema for demonstrating authenticity) to a key, such as a public key, that is tied to an identity. More simply put, digital certificates are electronic documents that are offered to prove or verify the identity of the user. Typically a digital certificate is issued by a certificate authority (CA) that has performed or established some threshold of information to assert that the party to whom the certificate is issued is indeed the party he or she reports to be.

In addition to identifying a person, a digital certificate may also include additional information, such as the level of authorization that should be afforded to the holder of the certificate, the duration of validity for the certificate, the user's real name, the user's alternative name, the intermediate certificate authority who issued the certificate, or other such information pertinent to establishing both the identity of the user of the digital certificate as well as the veracity of the root certificate authority ultimately responsible for the apparent authority vested in the digital certificate.

Indeed, digital certificates can and often do provide a great deal of simplicity in authenticating a user as the user has clearly established him or herself in some way that is sufficient for a certificate authority to provide the digital certificate. Relying on a digital certificate can ease a network's reliance on parties having previously established or contemporaneously establishing a local identity—a savings both in terms of time for the user and costs associated with the overhead and storage of the user identity for the local network.

It should also be noted that in most cases, a user requesting access to resources who is providing a name and password is in essence already connected to the network, and as such there is a potential security risk.

The Open System Interconnection model, also referred to as the Open Source Interconnection model or more simply the OSI model, is a product of the Open System Interconnection effort at the International Organization for Standardization, and more specifically is a prescription of characterizing and standardizing the functions of a communication system in terms of seven abstraction layers of concentric organization—Layer 1 the physical layer, Layer 2 the data link layer, Layer 3 the network layer, Layer 4 the transport layer, Layer 5 the session layer, Layer 6 the presentation layer, and Layer 7 the application layer.

TCP/IP based network communication is established at Layer 2-3, the network layer. By contrast, when a user is presented with a login screen requesting a User Name and Password, that interaction is occurring at the Application layer 7. Moreover, because the User has actually established connection through the Layers 1-6, there is a possibility that errant code and or configuration of network devices could permit a user to gain unwarranted access to some if not all resources without actually providing a proper username and password.

The use of certificates in proving user identity in and among networked resources is not entirely new. The prior art reference of Appiah US 2010/0077208 teaches an authentication service configured to authenticate User Credentials and generate an authentication certificate based on the User Credentials and the System Identifier FOR subsequent authentication to a Data Center. The prior art reference of Borneman U.S. Pat. No. 7,953,979 teaches a system and method to establish trust so that a trusted third party may then provide Signed Certificates to verify Trust, i.e. Master System is delegating authority.

The prior art reference of Guo US 2010/0247055 is teaching device specific authentication for website access (Layer 7)—a user with a device known to an account authority service can obtain a security token via a communications network to present to another entity via a communications network as proof of identity. The prior art reference of Liu US 2010/0154046 is teaching a single sign-on methodology across web sites and services (Layer 7). The prior art reference of Norefors US 2006/0094403 teaches a method of obtaining network service by using a phone having existing telecommunications service and a PC connecting to a Web Server (Layer 7) which directs a One Time Password to be sent via Short Message Service, also known as SMS, to the user's phone read by the user and provided back to the Web Server via the PC (Layer 7).

Still further, the prior art reference of Benantar US 2002/0144119, teaches a User obtaining a digital certificate from a Certificate Authority and the public and private certificates being loaded to a keystore of a Single Sign On system. The Single Sign On system uses the digital certificate to gate access to legacy applications (Layer 7). And of course it is clear that these legacy applications are within the Benantar network.

However, in all of these instances the use of the Certificate for identification or signing purposes is occurring at Layer 7—the Application layer. In all of these references, the underlying network connections have already been established and are being used. Moreover, although the use of a Digital certificate is being taught as a way of potentially increasing user authentication all of these references fall short of any attempt to further safeguard the original network connection. While the digital certificate can certainly be used for access to network resources and that is highly desirable, there are underlying security issues that these references fail to address.

The prior art reference of Ringland US 2013/0103833 is different. Ringland, teaches how a user of a mobile device may move from one network to another and maintain a consistent network access—i.e., the user is on a cellular network watching a movie and arrives home so the network connection transfers from the cellular network to the home network with the same address so that the streaming of the video is undisturbed. Within this methodology, Ringland teaches that User submits credentials (username and password) directly to a certificate provisioning server and the server creates a certificate and delivers the certificate directly to the user. The User's home access point is configured with a list of users who may access the Local Area Network (LAN) by presenting their digital certificate to the home access point.

A fundamental element present in all of these prior art references is that they teach how a digital certificate may be used for access to a system or application. They do not focus specifically on how the certificate is provided to the User.

Moreover, how a certificate is provided to a user can often be taxing. Indeed as digital certificates are most commonly used as attestations of trust, i.e., the signing of documents, messages, applications and the like, as well as the verification that another party is who he or she says they are, there is typically a great deal of concern on who should receive a certificate—has the user been properly vetted, what resources should he or she have, how long should the certificate last, where and when can the certificate be used, etc. . . .

While these issues are extremely relevant in some settings—as with the prior art references above—they are not relevant in all settings. Indeed the use of certificates can significantly increase security in accessing secured networks and network resources, but even as this element of increased security is achieved the use of certificates may simplify the overhead of keeping track of who has access to what and when, as well as other matters. But the prior art materials presently known have not addressed these issues.

Hence there is a need for a method and system that is capable of overcoming one or more of the above identified challenges.

SUMMARY OF THE INVENTION

Our invention solves the problems of the prior art by providing novel systems and methods for providing a certificate.

In particular, and by way of example only, according to one embodiment of the present invention, set forth is a system of providing a digital certificate by way of a browser extension including: a server system having at least one processor adapted to provide web pages to browsers of user devices, the server system further adapted to include at least one pattern and at least one identifier in at least one web page provided to a user's device, the server system further structured and arranged to receive from a browser extension upon a user's device that has recognized the pattern and extracted the identifier a certificate request (CSR) and the extracted identifier, and upon verification of the identifier and the CSR, generating a certificate based at least in part on the CSR and returning the certificate to the browser extension for installation upon the user's device.

In yet another embodiment, set forth is a method of providing a digital certificate by way of a browser extension including: providing a server system having at least one processor adapted to provide web pages to browsers of user devices, the server system further adapted to include at least one pattern and at least one identifier in at least one web page provided to a user's device, the server system further structured and arranged to receive from a browser extension upon a user's device that has recognized the pattern and extracted the identifier a certificate request (CSR) and the extracted identifier, and upon verification of the identifier and the CSR, generating a certificate based at least in part on the CSR and returning the certificate to the browser extension for installation upon the user's device.

For yet another embodiment, set forth is a method of providing a digital certificate by way of a browser extension including: providing a browser extension from a first system having at least one processor to a user's device having at least one processor, the browser extension plugging into a browser application on the user's device and monitoring web sites to which the browser application is directed by the user; monitoring web site pages to which the browser application is directed by the user with the browser extension for the presence of at least one predefined Pattern, and in response to the presence of at least one predefined pattern extracting from the monitored website page at least one identifier; generating a certificate request (CSR) with the browser extension; sending the CSR and the identifier to a remote second system by way of the browser extension, the second system generating a certificate based at least in part on the CSR upon verification of the identifier and returning the certificate to the user's device; receiving the certificate by the browser extension and installing the certificate upon the user's device.

Further still, for yet another embodiment, provided is a non-transitory machine readable medium on which is stored a computer program for providing a certificate by way of a browser extension, the computer program including instructions which when executed by a computer system having at least one processor performs the steps of: providing a server system adapted to provide web pages to browsers of user devices, the server system further adapted to include at least one pattern and at least one identifier in at least one web page provided to a user's device, the server system further structured and arranged to receive from a browser extension upon a user's device that has recognized the pattern and extracted the identifier a certificate request (CSR) and the extracted identifier, and upon verification of the identifier and the CSR, generating a certificate based at least in part on the CSR and returning the certificate to the browser extension for installation upon the user's device.

Yet further, another embodiment sets forth a method of providing a digital certificate by way of a browser extension including: receiving a browser extension from a first system to a user's device, the browser extension plugging into a browser application on the user's device and monitoring web sites to which the browser application is directed by the user; monitoring web site pages with the browser extension for the presence of at least one predefined pattern, and in response to the presence of at least one predefined pattern extracting from the monitored website page at least one identifier; generating a certificate request (CSR) with the browser extension; sending the CSR and the identifier to a remote second system by way of the browser extension, the second system generating a certificate based at least in part on the CSR upon verification of the identifier and returning the certificate to the user's device; receiving the certificate by the browser extension and installing the certificate upon the user's device.

And yet further, another embodiment sets forth a method of providing a digital certificate by way of a browser extension including: monitoring web site pages with a browser extension provided to a user's device for the presence of at least one predefined Pattern, and in response to the presence of at least one predefined pattern extracting from the monitored website page at least one identifier; generating a certificate request (CSR) with the browser extension; sending the CSR and the identifier to a remote second system by way of the browser extension, the second system generating a certificate based at least in part on the identification element upon verification of the identifier and returning the certificate to the user's device; receiving the certificate by the browser extension and installing the certificate upon the user's device.

DETAILED DESCRIPTION

Before proceeding with the detailed description, it is to be appreciated that the present teaching is by way of example only, not by limitation. The concepts herein are not limited to use or application with a specific system or method for providing a certificate, and more specifically a certificate for network access. Thus although the instrumentalities described herein are for the convenience of explanation shown and described with respect to exemplary embodiments, it will be understood and appreciated that the principles herein may be applied equally in other types of systems and methods involving providing a certificate.

This summary may be more fully appreciated with respect to the following description and accompanying Figures, in which like numbers represent the same or similar elements. Further, with the respect to the numbering of the same or similar elements, it will be appreciated that the leading values identify the Figure in which the element is first identified and described, e.g., element 100 appears in FIG. 1.

Various embodiments presented herein are descriptive of apparatus, systems, articles of manufacturer, or the like for systems and methods involving providing a certificate by way of a browser extension. In some embodiments, an interface, application browser, window or the like may be provided that allows the user of the computing device to direct behavior of the computing device.

Moreover, some portions of the detailed description that follows are presented in terms of the manipulation and processing of data bits within a computer memory. The steps involved with such manipulation are those requiring the manipulation of physical quantities. Generally, though not necessarily, these quantities take the form of electrical or magnetic signals capable of being stored, transferred, combined, compared and otherwise manipulated. Those skilled in the art will appreciate that these signals are commonly referred to as bits, values, elements number or other identifiable elements.

It is of course understood and appreciated that all of these terms are associated with appropriate physical quantities and are merely convenient labels applied to these physical quantities. Moreover, it is appreciated that throughout the following description, the use of terms such as "processing" or "evaluating" or "receiving" or "outputting" or the like, refer to the action and processor of a computer system or similar electronic computing device that manipulates and transforms data represented as physical (electrical) quantities within the computer system's memories into other data similarly represented as physical quantities within the computer system's memories.

The present invention also relates to apparatus for performing the operations herein described. This apparatus may be specifically constructed for the required purposes as are further described below, or the apparatus may be a general purpose computer selectively adapted or reconfigured by one or more computer programs stored in the computer upon computer readable storage medium suitable for storing electronic instructions.

To further assist in the following description, the following defined terms are provided.

"Browser"—also known as a web browser is a software application and/or module for retrieving, presenting and traversing network information as presented typically in textual and graphic form on what is commonly understood to be the Internet or World Wide Web. More specifically a user uses his or her Browser on his or her computing device having at least one processor to visit one or more information resources each of which is identified by a Uniform Resource Identifier (URI), or Uniform Resource Locator. The transfer of information between the user's system (the client) and the website (server) is most typically performed with Hypertext Transform Protocol in either its open or secure form (HTTP and HTTPS respectively) which is providing Hypertext Markup Language (HTML) which is the standard markup language used to create web pages.

"Browser Extension"—a computer program and/or module that extends the functionality of a web Browser in some way. As used herein, the Browser Extension is understood and appreciated to be distinct from similar terms such as a Browser plug-in or add-on, such as for example a Microsoft ActiveX control. In simple terms, the Browser Extension as described herein is understood and appreciated to not only extend the functionality of the web Browser, but the Browser Extension also operates independently from the web session. Moreover the Browser Extension is not launched by the Browser as a component of the Browser, or launched by the web page itself via HTML within the page. The Browser Extension may be launched and remain active or passive as a background process independent of the Browser and reads information from the web pages so as to authorize itself to the server when requesting a Certificate.

"Pattern"—a predefined and embedded element in the web pages provided by the Second System which will trigger a response and at least one behavior on the part of the Browser extension. Patterns may be geometric elements, URL patterns, a contents pattern of the HTML code providing the page, a flag in the HTML, a session identifier attribute in the HTML, information in the HTML response header, an audio signal pattern, or other embedded element within one or more HTML pages as provided by the Second System. Further, the Pattern may not be visually apparent to the user which is to say that it may be an element that the user does not visually distinguish to be separate or apart from the overall website content. Further still, the Pattern may be transparent in that it is truly not apparent to the user in any way.

"Identifier"—this is also an embedded element, such as but not limited to the session ID, an embedded username & password, URL address information, or other element that may be used to confirm the ultimate request for a certificate as provided by the Browser extension. For at least one embodiment the Pattern and the Identifier are understood and appreciated to be distinct. For yet another embodiment, the Identifier may be at least a portion of the Pattern.

"First System"—a web service or other system having at least one processor and operating as a computing device from which a user may obtain a Browser extension for use with his or her system and the web Browser thereon.

"Second System"/"Authorizing System"—the entity that, in response to a request to generate a certificate to permit network access as provided by the Browser extension reviews the request and the provided Identifier and upon a positive evaluation will return a certificate to the Browser extension for installation upon the user's system.

"Third System"—the network or application resource to which a user may connect or engage based on the user having an appropriate certificate.

"Server System"—the web service that provides HTML content including Patterns which are recognized by the Browser extension, and which will trigger one or more behaviors by the Browser Extension upon recognition.

"User"—typically a person or at the very least a device used by a person who is known to the First System in the sense that the he or she has established a user account with the First System by providing a threshold of data, e.g. attributes, to identify themselves. Typically it is expected that the Users' interactions with the First System will also serve to establish additional attributes about themselves.

"Certificate"—also referred to as a digital certificate, this is a credential that is usable for authentication to the Third System. In at least one embodiment, the Certificate is an X.509 digital certificate.

"Certificate Characteristic"—elements of data that are encoded into or associated with the Certificate. Certificate Characteristics may include but are not limited to, a root certificate authority, intermediate certificate authority, time period, common name, subject's name, subject's alternative name.

"Secured Network Access"—the fundamental OSI Layer 2-3 connection between the User's computing system and Third System, the network connection established without the need for the User to provide a user name, password, or other element, rather the connection is fundamentally based on the User having an appropriate Certificate. Moreover it is the first communication link between the User's Device and the Third System, and is not a subsequent connection from a device the User's computing system has already connected to at Layer 2-3. In a wireless network setting, the Certificate is automatically provided to the Third System's SSID and the connection is established. Without the Certificate, no secured network access is established with the Third System.

Secured Network Access

"Secured Application Access"—this is OSI Layer 7 access to an applicant based on the Certificate. Moreover, Secured Application Access is understood and appreciated to be distinct from Secured Network Access.

With respect to the above defined terms, it is understood and appreciated that for at least one embodiment, each module or system is implemented as a collection of independent electronic circuits packaged as a unit upon a printed circuit board or as a chip attached to a circuit board or other element of a computer so as to provide a basic function within a computer. In varying embodiments, one or more modules may also be implemented as software which adapts a computer to perform a specific task or basic function as part of a greater whole. Further still, in yet other embodiments one or more modules may be provided by a mix of both software and independent electronic circuits.

To briefly summarize, provided are a system and method for providing a Certificate by way of a Browser Extension. More specifically, for at least one embodiment, a Browser Extension is provided from a First System to a User device, the Extension plugging into a Browser application on the User device. This Browser Extension monitors web site pages to which the Browser application is directed for the presence of at least one predefined Pattern, and in response to the presence of at least one predefined Pattern, extracting from the monitored website page at least one Identifier. The Browser Extension then autonomously generates a Certificate request (CSR) and sends the CSR and the Identifier to a remote Second System. The Second System generates a Certificate based at least in part on the CSR upon verification of the Identifier and returns the Certificate to the User device, the Browser Extension installing the Certificate upon the user's device.

Figure 1:
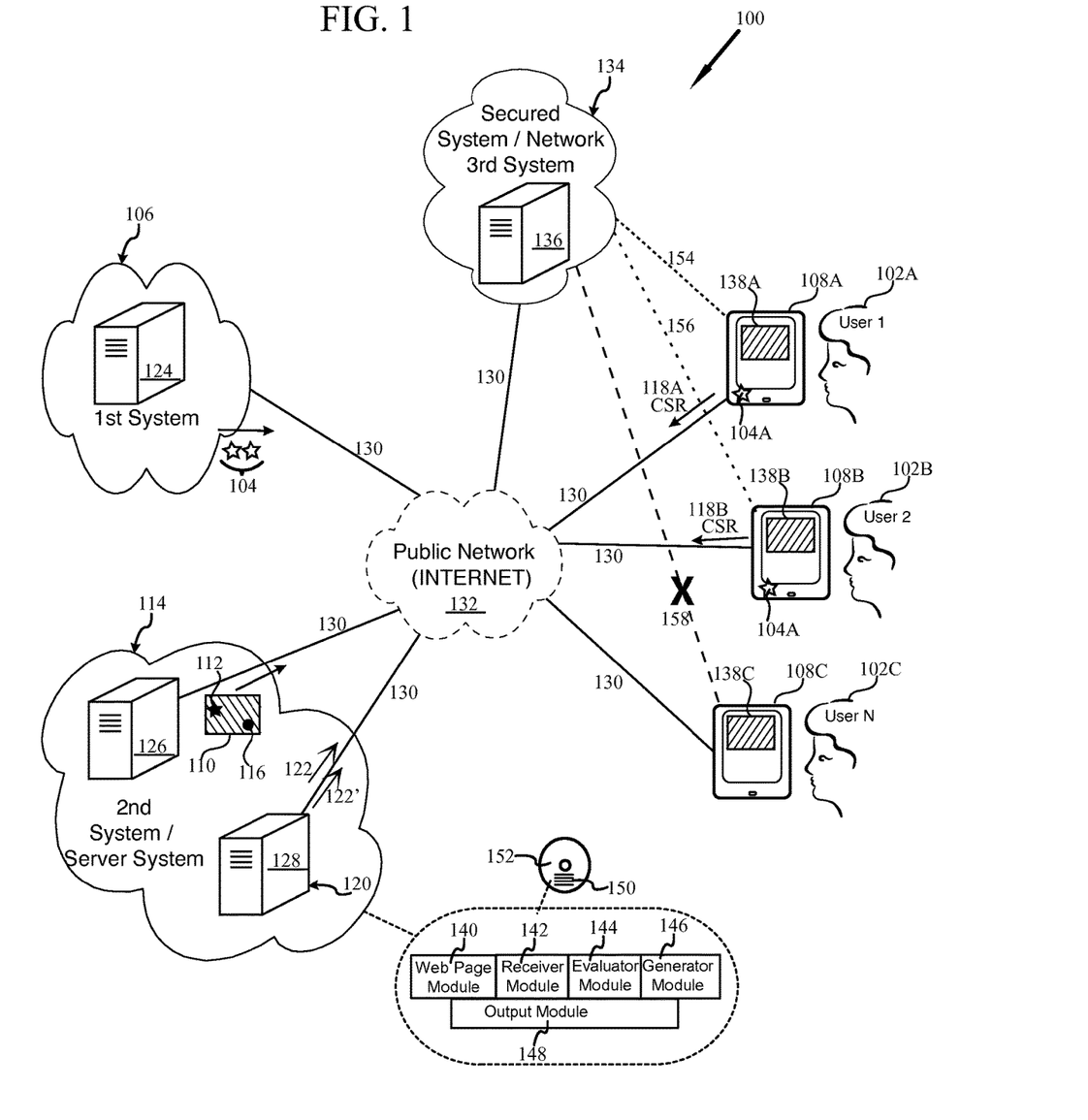
FIG. 1 is a high level diagram of a system for providing a certificate by way of a browser extension in accordance with at least one embodiment.

Turning now to the drawings, and more specifically FIG. 1, there is shown a conceptualized illustration of a System for Providing a Certificate (hereinafter "SPC" 100), to Users 102 by way of a Browser Extension 104. The Browser Extension 104 is provided by a First System 106 to the User's device 108, hereinafter "UD 108,", and once obtained will monitor web site pages 110 for the presence of at least one predefined Pattern 112. When the Browser Extension 104 detects a predefined Pattern 112 in a web site page 110 from a Server System 114, the detection triggers the Browser Extension 104 to extract an Identifier 116 and generate a Certificate request (CSR) 118 to be sent to a remote Second System 120. The Second System 120 will generate a Certificate 122 based at least in part on the CSR 118 upon verification of the Identifier 116 and return the Certificate 122 to the UD 108, and more specifically the Browser Extension 104 which installs the Certificate upon the UD 108.

In accordance with at least one embodiment, it is understood and appreciated that the Browser Extension 104 operates semi-autonomously, which is to say that User 102 does not need to control, adjust, specify settings, provide login or identity information or otherwise actively direct the operation of the Browser Extension 104. Indeed for at least one embodiment, the User 102 may not even be aware that the Browser Extension 104 is active.

Also shown are a First System 106, Second System 120 and Server System 114, and for the present example each of these entities is conceptually shown to be a distinct computer system 124, 126 and 128 respectively, and each of these entities is shown to have a communication link 130 to a public network 132 such as the Internet. A Third System 134 is also shown, and provided by a distinct computer system 136. This Third System 134 may also have a communication link 130' with the public network 132.

In varying embodiments the elements of the SPC 100 may be directly connected to one another, but it is understood and appreciated that in most instances the incorporation of the Internet 132 as a common means of communication and information exchange is within the scope of the invention.

It is also to be understood and appreciated that the elements of the SPC 100 need not maintain continual communication links 130. In other words, Users 102 may log on or off, First System 106, Second System 120, Server System 114 and the Third System 134 may be on or off line at different times for different reasons.

With respect to FIG. 1, for the present example, there are shown a plurality of Users 102, of which users 102A, 102B and 102C identified as User 1, 2 and N are exemplary. Each User 102 also has a UD 108 which is understood and appreciated to be a computing device having at least one processor. As shown, in many instances the UD 108 will be a mobile computing device, such as but not limited to a tablet, phone, PDA, laptop, smart watch, smart glasses, or the like. The UD 108 may also be a more traditional work station computer. Regardless of the specific nature of the UD 108, it is understood and appreciated that the UD 108 has at least one Browser 138 thereon so that the UD 108 can navigate to websites and receive and display information.

When the Browser 138 of the UD 108 is directed to the First System 106, the First System 106 will provide a Browser Extension 104 to the UD 108. In varying embodiments, access to the First System 106 may be gated, such that a User 104 must provide some form of identification before being provided with the Browser Extension 104. In other cases the URL for the First System 106 may be valid for a specific time window known only to specific Users, may be hidden, or may only be accessible as a secure system within a secured network. In other embodiments the First System 106 may be publically available to all.

As will also be appreciated from FIG. 1, the UD 108 is distinct from the First System 106, the Second System 120, and the Third System 134. In at least one embodiment, the Server System 114 and the Second System 120 may be the same computing system.

Moreover, for at least one embodiment, the Second System 120 and Server System 114 are one and the same, a system adapted to provide web pages 110 to Browsers 138 of UD's 108. This integrated system is further adapted to include at least one Pattern 112 and at least one Identifier 116 in at least one web page provided to a UD 108. Further, the integrated system is structured and arranged to receive from a Browser Extension 104 upon a UD 108 that has recognized the Pattern 112 and extracted the Identifier 116 a CSR 118 and the extracted Identifier 116. Upon verification of the Identifier 116 and the CSR 118, the integrated system will generate a Certificate 122 based at least in part on the CSR 118 and return the Certificate 122 to the Browser Extension 104 for installation upon the UD 108.

Moreover, to facilitate this adaptation of the integration of a combined Second System 120 and Server System 114, in at least one embodiment the integrated system has a web page module 140, a receiver module 142, an evaluator module 144, a generator module 146 and an output module 148. The web page module 142 is structured and arranged to provide at least one web page with a predetermined Pattern 112 and Identifier 116 to Browsers 138. The receive module 142 is structured and arranged to receive the Identifier 116 and CRS 118 from a Browser Extension 104 upon a UD 108, such as by HTTP/HTTPS communication. The evaluator module 144 is structured and arranged to evaluate the Identifier 116, and for at least one embodiment the CRS 118 as well, so as to validate the Browser Extension 104 and the CRS 118. The generator module 146 is structured and arranged to generate a Certificate 122 upon verification of the Identifier 116. The output module 140 is structured and arranged to provide the Certificate 122 to the Browser Extension 104 for installation upon the UD 108.

With respect to SPC 100, it is understood and appreciated that in varying embodiments, the elements, e.g., the web page module 140, a receiver module 142, an evaluator module 144, a generator module 146 and an output module 148 may be provided as software routines, hardware elements and/or combinations thereof. Although shown distinctly for ease of illustration and discussion, in varying embodiments, it is understood and appreciated that one or more of these elements may be combined and/or further subdivided into a number of sub-elements or sub-modules.

With respect to FIG. 1, the elements of the web page module 140, a receiver module 142, an evaluator module 144, a generator module 146 and an output module 148 are conceptually illustrated in the context of an embodiment for a computer program 150. Such a computer program 150 can be provided upon a non-transitory computer readable media, such as optical disc 152 or jump drive (not shown), having encoded thereto an embodiment of a program for providing a Certificate 122 by way of a Browser Extension 104.

The computer executable instructions for computer program 150 are provided to combined Second System 120 and Server System 114. During operation, the program for providing a Certificate 122 by way of a Browser Extension 104 may be maintained in active memory for enhanced speed and efficiency. In addition, the program for program for providing a Certificate 122 by way of a Browser Extension 104 may also be operated within a computer network and may utilize distributed resources.

As noted with respect to the prior art references above, in typical situations involving Certificates, the User specifically requests the certificate and/or provides specific information such as a user name, password or other identification as an active and involved participant in the process of obtaining a Certificate. Under the present invention however, the User's active involvement is quite different, and potentially non-existent save for navigating the Browser 138 on his or her device 108 to the First System 106 and subsequently then to the Server System 114. Moreover it is the Browser Extension 104 detecting the predefined Pattern 112, extracting an Identifier 116 and subsequently the Second System 120 receiving and validating the CSR 118 and Identifier 116 that collectively result in a Certificate being provided to the UD 108.

In addition, for at least one embodiment as further discussed below, different Users 102 may ultimately receive different Certificates 122—i.e., User 102A as a manager receives a Certificate 122 with different Characteristics then does User 102B who is a sales representative and receives Certificate 122'.

It should be understood and appreciated that the User's computing device 108 is distinct from the First System 106, the Second System 120, and the Third System 134. Moreover the User 102 does not self generate a self-signed Certificate. More specifically, an advantageous point of novelty, further described below, is that the present invention teaches the process of issuing a Certificate.

In all cases under the present invention, the user's system receives by way of the Browser Element a Certificate from a remote system that is distinct from the User's system. In varying embodiments, the First System 106, the Second System 120, and the Third System 134 may be combined in some ways—but even so they are distinct from the User's computing device 108.

It is understood and appreciated that in nearly all cases the system to which the Certificate 122 will grant the User 102 access is understood and appreciated to be distinct from the First System 106, the Second System 120, and the Server System 114. Moreover the User 102 does not present a received Certificate 122 to the First System 106 or the Second System 120 but rather to a secured Third System 134. Indeed, by dividing the systems any inherent security risks are further minimized as the process of obtaining a Certificate 122 from the Second System 120 is distinct from actually accessing the Third System 134.

The User 102 may be in network communication with the Third System 134 at the same time he or she is also in network communication with the First System 106 and/or the Second System 120, but it is to be specifically understood that the user's connection to the Third System 134 is direct—that access is not being provided as a redirect or pass through from the other systems to the Third System 134. Indeed communications link 154 shown for User 102A is clearly shown to be direct to Third System 134, as is communications link 156 shown for User 102B. The difference in dot line pattern between communications links 154 and 156 is also provided to illustrate that Users 102A and 102B enjoy different Certificates based access with Third System 134 based on Users 102A having a Certificate 122 on device 102A with at least one different Characteristic from the Certificate 122' on device 102B held by User 102B. User 102C who does not have a Certificate 122, or at least a valid Certificate cannot establish communication link 158 with the Third System 134.

Figure 2:
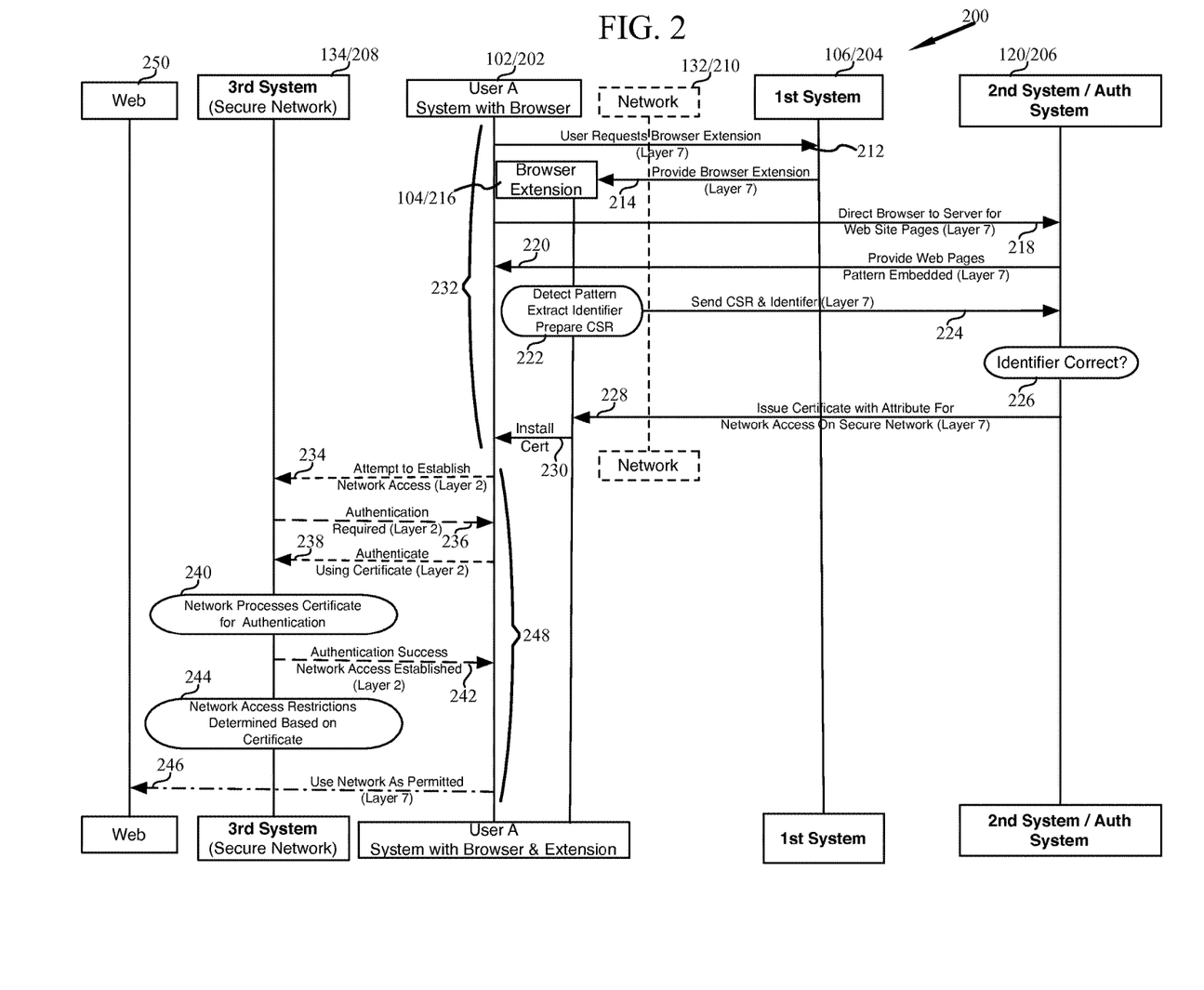
FIG. 2 is a high level time line diagram for the operation of a system for providing a certificate by way of a browser extension in accordance with at least one embodiment.

The operation of SPC 100 as shown in FIG. 1 may be further appreciated with respect to FIG. 2, presenting a time sequence flow diagram 200. As shown in FIG. 2 a User 102 having a device, aka system, with a Browser shown as element 202. To the Right of the User element 200 are shown the First System 106 as First System element 204 and the Second System 120 as Second System element 206. To the Left of the User element 200 is shown the Third System 134 as Third System Element 208. This arrangement of elements is significant for it serves to further reinforce that the Third System 134/208 is distinct from the First System 106/204 and the Second System 120/206.

As shown in FIG. 2, utilizing an existing Network 210, the User directs his or her system with a Browser to the First system 204, and requests the Browser Extension, event 212. In varying embodiments, this request for the Browser Extension may be an overt request clearly expressed by the User, or may be a more passive action wherein simply browsing to the First System 204, supplying a code, answering question(s), completing a captcha task, or accomplishing some other task is recognized as an appropriate trigger or request that is met by providing the User's device and Browser 138 with a Browser Extension 104.

Again, it is to be understood and appreciated that the Browser Extension 104 is not simply a Browser plug-in or add-on, such as a Microsoft ActiveX element. An ActiveX element is launched by the Browser or even by the HTML code providing the web page. Browser Extension 104 is a more complex module as it is understood and appreciated to not only extend the functionality of the web Browser 138, but the Browser Extension 104 also operates independently from the web session, and may further act autonomously.

Moreover, as shown in event 214, the Browser Extension 104/216 is provided to the User 102/202. With the Browser Extension 104/216 now installed upon the UD 108, the User 102 subsequently directs the Browser 138 to the Second System 120/206. For at least one embodiment, it is understood and appreciated that browsing to the Second System 120/202 need not be performed as the next action—the User may browse to a social media site, new site, entertainment site, other site, or perhaps even shut down his or her device. What is important is the understanding that the Browser Extension 104/216 is now in place upon his or her device 108 such that when he or she does direct the Browser 138 to the Second System 120/206, the Browser Extension 104 it will be ready to perform at least one advantageous operation.

Continuing with the example of FIG. 2, in event 218 the User 102/202 directs the Browser 138 to the Second System 120/206 for one or more web pages 110. Second System 120/206 provides one or more web pages as would be typically expected. Of advantageous distinction is the fact that at least one of the provided web pages 110 contains a predefined Pattern 112.

In varying embodiments, this predefined Pattern 112 may be transparent to the User 102, or simply not visually apparent to the User 102 as it may appear as a normal or un-noteworthy element. However, to the Browser Extension 104/216 the predefined Pattern 112 is significant. The predefined Pattern 112 may be any element that can indeed be predefined and which is not likely to occur naturally or by accident. It may be a collection of specific pixels appearing with a predefined intensity, hue, or other characteristic, it may be a specific ordering of graphics or alphanumeric characters, or other element.

Moreover, in varying embodiments the Pattern 112 may selected from the group consisting of: a URL pattern, a contents pattern of the HTML code providing the page 110, at least one flag in the HTML, a session identifier attribute in the HTML, information in http response headers, a session ID, a component of a session ID, a geometric pattern, a one time password, or other variable page element that may be predefined for later recognition and distinction. Further, for at least one embodiment it is understood and appreciated that there more than one predefined Patterns 112 provided in at least one web-page 110.

This behavior of Browser Extension 104/216 to monitor web pages 110 for a predefined Pattern 112 should not be undervalued. When a system or device requests a Certificate 122, typically there is some verification process to ensure that the requesting entity is entitled to receive the Certificate 122. This verification may come from an authenticated third party who is requesting a Certificate for or on behalf of another party, or from the entity who will use the Certificate. Under the present invention, request by a third party and their authentication is not practical as the Certificate 122 is to be provided by way of the Browser Extension 104/216. However, as an application, the Browser Extension 104/216 is an unknown and unverified entity, which by its very nature must be generic. Monitoring web pages 110 for a predefined Pattern 112 so as to extract an Identifier 116 permits the Browser Extension 104/216 to authenticate itself and more specifically the Certificate request by way of the Identifier 116.

As the Browser Extension 216 is in a monitoring state, monitoring web site pages 110 to which the Browser 138 is directed by the User 102 for the presence of at least one predefined Pattern 112, upon the detection of at least one predefined Pattern 112 the Browser Extension 216 extracts at least one Identifier 116 from the web page, event 220. It is of course understood and appreciated that the elements of the provided web page are interpreted by the Browser 138 and the Browser Extension 104 for the rendering and processing of the web page. Extracting at least one Identifier 116 is a step beyond, for the action of extracting at least one Identifier 116 is a specific action performed so as to capture a specific element of data for later use. In addition, for at least one embodiment, the Identifier 116 may is a predefined static element that is extracted from the web page. For at least one alternative embodiment, the Identifier is a dynamic element that is changed continuously, randomly, or at intervals—such that a comparison may be performed against a history of the Identifier 116. This comparison against history may be performed to ensure that the extraction of the Identifier 116 and request for a Certificate are events that are occurring substantially contemporaneously, or at least within a permitted time frame.

To suggest that this Identifier 116 as data may exist in a cache, memory archive, file or other arbitrary collection of data where the Identifier 116 has not been specifically identified is not equivalent to the action of extracting the Identifier 116 as intended herein. For example, a computer may access a file and print pages of text as a direct result of processing the file and indeed the file data may have passed through the processor—but the individual words and related structure are not retained for later use. In contrast, in response to the detection of a Pattern 112, the Browser Extension 104/216 will look for a specific element—i.e., third word in a metadata header, a session ID, an embedded username and password, a part of the detected Pattern, or other specific data element which is recorded, i.e. extracted, for later use.

The Browser Extension 104/216 then proceeds to prepare a Certificate request "CSR" 118. In public key infrastructure "PKI" systems, a CSR is understood as a message sent from an applicant system to a Certificate Authority in order to request/apply for a digital Certificate. The CSR contains information that identifies the applicant system, such as but not limited to a distinguished name, business name, department or organization unit, town/city, province/region/county/state, country, bit size, email, a public key. For at least one embodiment, in preparing the CSR, the Browser Extension 104/216 may use the Identifier 116 as one of these many data fields. For yet another embodiment, as the data included in the CSR is in effect incorporated into the Certificate, an additional component extracted from the website may be included—thus providing a specific "fingerprint" for which website was used by the Browser Extension 104/216. And again, this additional component may be static or dynamic in varying embodiments.

As the Browser Extension 104/216 is operable to extend the functionality of the Browser 138, the ability to generate the CSR 118 and establish a HTTP/HTTPS connection with the Second System 120/206 is a pre-established behavior. By way of the HTT/HTTPS connection, the Browser Extension 104/216 sends the Second System 120/206 the CSR 118 and the extracted Identifier 116, event 224.

Upon receipt of the CSR 118 and the Identifier 116, the Second System 120/206 can and will verify that indeed the CSR 118 was generated by a Browser Extension 104/216. The Identifier 116 may be used in varying ways to further prove or at least verify the legitimacy of the request. For example, if the Identifier 116 is a session date that is days or even hours old such that it is outside a valid time window, or which does not match any of the session IDs known to the Second System 120/206, the request may be denied.

Similarly, the Identifier 116 may have been an intentionally placed echo of the User System's IP address—and if the CSR 118 is received from an IP address that does not match the IP address provided as the Identifier 116, the request may be denied. These examples are by no means intended as the only options or limitations for how the Identifier 116 may be used, but merely as examples of at least two different uses.

If the Second System 120/206 evaluates the CSR 118 and the Identifier 116 to be valid, event 226, then the Second System 120/206 will provide a Certificate 122 back to the Browser Extension 104/216, event 228. Moreover, for at least one embodiment the Second System/Authorizing System will generate the Certificate 122 itself, i.e., acting as a Certificate Authority (CA). In at least one alternative embodiment, the Second System 120/206 will act as proxy for a Certificate Authority (CA) and either pull a Certificate 122 from a CA or direct the Browser Extension 104/216 to the CA.

In either case, the Browser Extension 104/216 is provided with a Certificate 122. For at least one embodiment the transmission of this Certificate is again by HTTP/HTTPS. Upon receipt, as shown in FIG. 2, the Browser Extension Browser Extension 104/216 will then install the Certificate 122 upon the User's device 108, event 230, for future use with the Third System 134/208.

As the Browser Extension 104/216 operates independently from the Browser and the web session, for at least one embodiment the Browser Extension 104/216 is further structured and arranged to monitor the status of the Certificate 122, such as for revocation or expiration. This monitoring may be achieved as an action upon system boot, or when the Browser is opened. This may be achieved, for example, but not limited to the Browser Extension 104/216 querying the Online Certificate Status Protocol "OCSP" or Certificate Revocation List "CRL." Such a query may be performed as a batch process. In addition, as the Certificate 122 has a validity date, the Browser Extension 104/216 may for at least one embodiment compare this validity date to the current date indicated by the UD 108.

With respect to FIG. 2 and the above described events, it will be appreciated that these events all occur with existing network access and connectivity. Further, these events are performed between the User 102/202 and the First System 106/204 and the Second System 120/206—not the Third System for which use of the now installed Certificate 122 is intended. Moreover, these events are the advantageous essence for how the Certificate 122 is provided to the User 102 by way of the Browser Extension 104/216, these are the provisioning events 232 for receiving a Certificate 122.

It is specifically understood and appreciated that aside from the User directing the Browser 138 to the First System 106/204 and subsequently to the Second System 120/206, and even these actions may actually be redirections from another site, the User's roll in obtaining the Certificate 122 is quite non-traditional. Moreover the user does not need to provide credentials, i.e., a username and password, the user does not have to directly ask for a Certificate, the user does not need to complete a contract or agreement to receive the Certificate, or in some other way play a central and direct roll in the acquisition of the Certificate 122.

Returning to FIG. 2 and with reference to FIG. 1, with the Certificate 122 now received and installed, advantageous use of the Certificate as provided by way of a Browser Extension 104/216 may also be appreciated.

Moreover, it should also be understood and appreciated that the present invention's teaching to provide a Certificate by way of a Browser Extension 104/216 is not specifically intended to provide Certificates 122 that may be used in the customary way of signing documents, notes and applications or providing attestations of trust. Rather, the present invention's system and method for providing a Certificate 122 advantageously capitalize on the generally overlooked ability of a Certificate 122 to be used in fundamentally establishing Layer 2 and Layer 3 of the OSI Network model, so as to provide the fundamental network connection upon which all further operations for data exchange are preformed.

This advantageous use of the Certificate may be more fully appreciated with the following example. As shown by event 234, with the Certificate 122 now installed, the User 102/202 may now visit a secured network that has been preconfigured to accept Certificates 122 for network access. Moreover, at least one embodiment, this Third System 134/208 is a Certificate Based Secured system—only a User with a valid Certificate can establish a connection—no Certificate, no connection.

As noted above, for at least one embodiment this is a Layer 2 connection. If the User has the correct Certificate 122 then he or she is simply granted access. If the User does not have the correct Certificate 122 then he or she remains disconnected from the Secured Third System 134/208.

For example, if the Certificate 122 for certificate based access is used with a wireless network, as soon as the user's computing device becomes aware of the SSID for that Secured Network it will automatically provide the Certificate 122 and establish secured certificate based wireless network access. If the User does not have a valid Certificate 122 or any certificate at all, while he or she may be able to see the SSID (if it is made visible) he or she can do nothing further with respect to attempting access for access is dependent entirely upon the User having a valid Certificate 122. Moreover, the wireless connection is once again a Layer 2/Layer 3 operation and achieved only with a valid Certificate 122.

Of course a similar Certificate based connection can also be established by way of a physical network connection line such as a Cat5/Cat6 patch cable or the like, where again the Layer 2/Layer 3 connection is established only upon the presentation of a valid Certificate 122. In yet other embodiments, the further access to the Secured Network and or Secured Resources is again dependent upon the User having a valid Certificate—but this may be at the Application layer, Layer 7. Still, in all cases the initial provisioning of the Certificate 122 as shown and described with respect to events 232 is based upon the actions of the Browser Extension 104/216 to recognize the embedded Pattern 122, extract the Identifier 116 and send the CSR 118 with the Identifier 116 to the Second System 120/206.

For ease of illustration and discussion, this process of authenticating to the Third System 134/208 may be generally described as follows. The Third System 134/208 signifies that authentication is required, event 236 and in response the User 102/202 provides the installed Certificate 122. Of course, for at least one embodiment with the detection of the SSID by the Users device is also the indication that Authentication is required. For such a configuration, the initial request for connection by the User 102/202 will include the Certificate 122.

The Third System 134/208 will review the received Certificate 122 for authentication, event 240, and if the Certificate 122 is valid, establish network access with the User 102/202, event 242.

It should also be understood and appreciated that the Certificate 122 provided has at least one Certificate Characteristic. For at least one embodiment, all Users 102, or at least a subset of users may be provided with the same Certificate 122 having the same Characteristic—as such all of those Users 102 having the same Certificate 122 enjoy the same level of certificate based access to the Third System 134/208. For at least one alternative embodiment, different Users 102 are provided with different Certificates 122 and these Certificates 122 may well have different Characteristics. As such different levels of Certificate based access on the Third System 134/208 may be provided to different Users, event 244.

In varying embodiments the differences in Certificates 122 and their respective Characteristics may be determined at least in part by the website to which the User 102 went to receive the embedded Pattern 112, and the Identifier 116 that was also extracted. Of course additional information may also be used to determine the Certificate 122 and Characteristic for one User 102 as opposed to another.

With network access now achieved, the User 102 now enjoys use of the network as permitted by the Characteristics of his or her Certificate 122, event 246. For at least one embodiment, this use of the Third System 134/208, i.e., the secured wireless network, permits access back to the Web 250. In short, those Users 102 who have a valid Certificate 122 may utilize the Third System 134/208 for access to the Internet as a preferred option to a cellular connection which may or may not be possible.

With respect to FIG. 2 the distinction between events may be more fully appreciated. Moreover, provisioning events 232 are specifically understood with respect to the how and why a Certificate will be provided to a User 102 by way of a Browser Extension 104/216, whereas Certificate use events 248 regard an example of at least one advantageous use of the provided Certificate 122. Both are advantages of the present invention and both are distinct. While they may be mutually combined in various embodiments, it is also to be understood and appreciated that the events of providing the Certificate 122 are themselves advantageously distinct over the prior art as known.

The exemplary use of the provided Certificate 122 may be viewed for some embodiments as an all access pass—once the User 102/202 has the Certificate they are good to go in establishing a connection with a Secured Third System 134/208 without need for further credentials. Those Users 102 who have a valid Certificate 122 are good to go—those Users 102 who do not have a valid Certificate 122 cannot establish any form of access—they are barred at the door.

Indeed, for at least one embodiment, the SPC 100 may be summarized as a system of providing a digital Certificate 122 by way of a Browser Extension 104 including: a Server System having at least one processor adapted to provide web pages 110 to Browsers 138 of User devices 108, the Server System further adapted to include at least one Pattern 112 and at least one Identifier 116 in at least one web page 110 provided to a User Device 108, the Server System further structured and arranged to receive from a Browser Extension 104 upon the User's Device 108 that has recognized the Pattern 112 and extracted the Identifier 116 a Certificate request (CSR) 118 and the extracted Identifier 116, and upon verification of the Identifier 116 and the CSR 118, generating a Certificate 122 based at least in part on the CSR 118 and returning the Certificate 122 to the Browser Extension 104 for installation upon the User's computing device 108.

Figure 3:
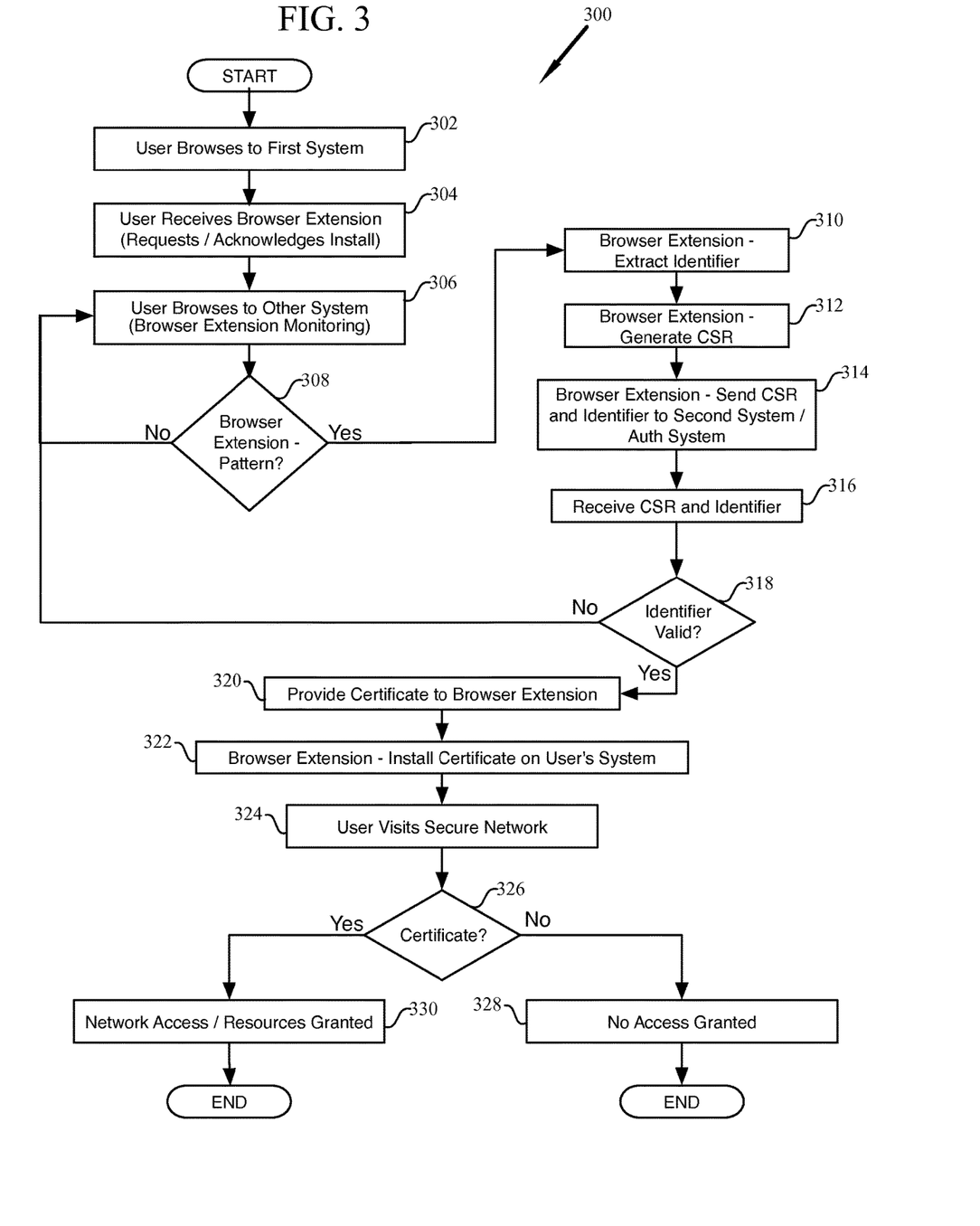
FIG. 3 is a high level flow diagram for a method of providing a certificate by way of a browser extension in accordance with at least one embodiment.

Having described embodiments for SPC 100 as shown with respect to FIGS. 1 and 2, other embodiments related to varying methods of providing a Certificate 122, and more specifically providing a Certificate 122 for network access upon a Third System 134 will now be discussed with respect to FIG. 3, in connection with FIGS. 1 and 2. It will be appreciated that the described method need not be performed in the order in which it is herein described, but that this description is merely exemplary of one method of providing a Certificate 122.

In general, method 300 commences with a User directing the Browser 138 on his or her computing device 108 to a First System 106, block 302. As the Browser Extension 104 is typically an application or module that is recognized to be a potentially active component, the User typically receive some notification to approve that the Browser Extension 104 may be downloaded, or must otherwise request or acknowledge the installation of the Browser Extension 104, block 304.

With the Browser Extension 104 now installed, the User 108 will brows to other websites, and while doing so the Browser Extension 104 will be in a monitoring state, block 306. As each web page 110 is visited, the Browser Extension 104 monitors each visited web page 110 for an embedded Pattern 112, decision 308.

In the event that the Browser Extension 104 detects an embedded Pattern 112, decision 308, the Browser Extension 104 will become more active. As the Browser Extension 104 is operable to extent the functionality of the Browser 138, the Browser Extension 104 will extract at least one Identifier 116 from the web page 110, block 310. Next, the Browser Extension 104 will generate a CSR 118, block 312, and forward the CSR 118 along with the extracted Identifier 116 to the Second System 120, block 314. The forwarding of the CSR 118 and the extracted Identifier 116 is typically performed via an HTTP/HTTPS connection with the Second System 120. As noted above, the extracted Identifier 116 advantageously serves to authenticate the Browser Extension 104 and/or the CSR to the Second System as the Browser Extension 104 is by it's very nature generic.

The Second System 120 receives the CSR 118 and Identifier 116, block 316. If the Identifier 116 is valid, decision 318, the Second System 120 will generate and provide a Certificate 122 back to the Browser Extension 104, block 320, typically again via HTTP/HTTPS. Again, acting as an extension of the Browser 138, the Browser Extension 104 will receive the receive and install the Certificate 122 upon the User's Device 108, block 322.

Continuing, the User 102 now visits a secured network, e.g., Third System 134, block 326. Access to the Third System 134 is based upon the User having a proper Certificate 122, decision 326. Moreover, if the User 102 does not have a Certificate 122, or has an invalid Certificate 122 then he or she is denied access, block 328. On the other hand, if the User 102 has a valid Certificate 122, then he or she is permitted access to the network and or secured resources of the Third System 134, block 330.

It is specifically understood that this access based on the Certificate is fundamentally different from the more traditional experience of gaining secured access through a web portal by providing an acceptance of a Terms of Use With, a credit card, a user name and password, or some other form of credential. In such cases, the fact that a web site is provided indicates that network access has been established—albeit of a perceived limited form. Under the present invention as set forth and described above with respect to SPC 100 and Method 300, if the User 102 does not have a proper Certificate then no network access is provided at all.

With respect to the above discussions, it is understood and appreciated that the Certificates 122 provided to Users 102, may be adapted for use other than or in addition to network access. Moreover, the methods and systems presented herein are indeed adapted and intended for use in providing Certificates 122 for Network Access upon one or more Third Systems 134. But it is understood and appreciated that the teachings for how such Certificates 122 are provided is indeed applicable to other settings where Certificates 122 are desired by Third Systems 134 for applications that may or may not involve network access.

Figure 4:
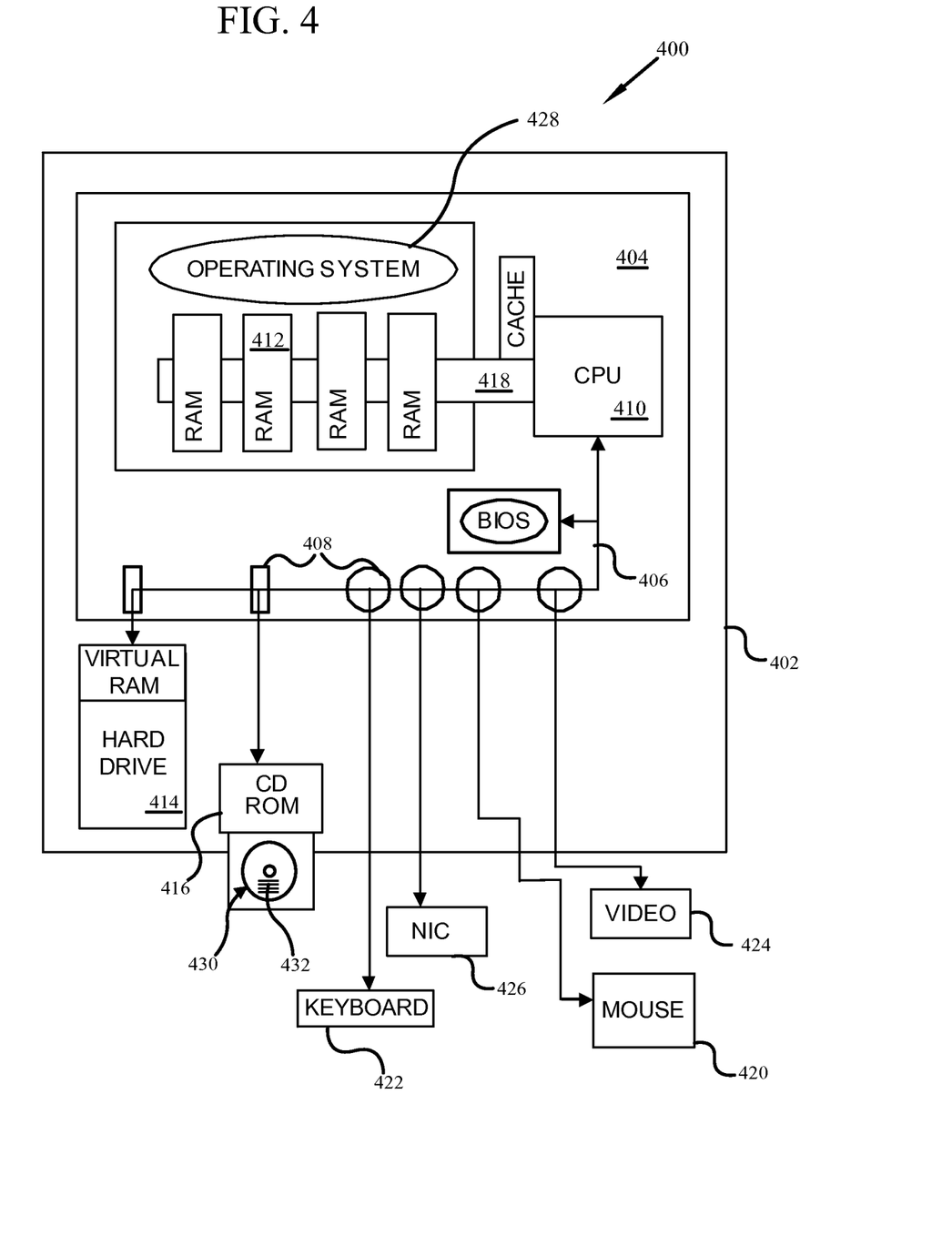
FIG. 4 is a high level block diagram of a computer system in accordance with at least one embodiment.

With respect to the above description of the system and method for providing a Certificate 122 by way of a Browser Extension 104, it is understood and appreciated that the method may be rendered in a variety of different forms of code and instruction as may be used for different computer systems and environments. To expand upon the initial suggestion of the First System 104, Second System 120, Server System 114, Third System 134, and User's Device 108 being computer systems adapted to their specific roles, FIG. 4 is a high level block diagram of an exemplary computer system 400 such as may be provided for one or more of the elements comprising the First System 104, Second System 120, Server System 114, Third System 134, and User's Device 108.

Computer system 400 has a case 402, enclosing a main board 404. The main board 404 has a system bus 406, connection ports 408, a processing unit, such as Central Processing Unit (CPU) 410 with at least one microprocessor (not shown) and a memory storage device, such as main memory 412, hard drive 414 and CD/DVD ROM drive 416.

Memory bus 418 couples main memory 412 to the CPU 410. A system bus 406 couples the hard disc drive 414, CD/DVD ROM drive 416 and connection ports 408 to the CPU 410. Multiple input devices may be provided, such as, for example, a mouse 420 and keyboard 422. Multiple output devices may also be provided, such as, for example, a video monitor 424 and a printer (not shown). As computer system 400 is intended to be interconnected with other computer systems in the SPC 100 a combined input/output device such as at least one network interface card, or NIC 426 is also provided.

Computer system 400 may be a commercially available system, such as a desktop workstation unit provided by IBM, Dell Computers, Gateway, Apple, or other computer system provider. Computer system 400 may also be a networked computer system, wherein memory storage components such as hard drive 414, additional CPUs 410 and output devices such as printers are provided by physically separate computer systems commonly connected together in the network. Those skilled in the art will understand and appreciate that the physical composition of components and component interconnections are comprised by the computer system 400, and select a computer system 400 suitable for one or more of the computer systems incorporated in the formation and operation of SPC 100 and/or the implementation of method 200.

When computer system 400 is activated, preferably an operating system 428 will load into main memory 412 as part of the boot strap startup sequence and ready the computer system 400 for operation. At the simplest level, and in the most general sense, the tasks of an operating system fall into specific categories, such as, process management, device management (including application and user interface management) and memory management, for example. The form of the computer-readable medium 430 and language of the program 432 are understood to be appropriate for and functionally cooperate with the computer system 400.

For at least one embodiment, the computer-readable medium 430 and the language for the program 432 adapt the computer system 400 as a system of providing a digital Certificate 122 by way of a Browser Extension 104 including: a Server System having at least one processor adapted to provide web pages 110 to Browsers 138 of User devices 108, the Server System further adapted to include at least one Pattern 112 and at least one Identifier 116 in at least one web page 110 provided to a User Device 108, the Server System further structured and arranged to receive from a Browser Extension 104 upon the User's Device 108 that has recognized the Pattern 112 and extracted the Identifier 116 a Certificate request (CSR) 118 and the extracted Identifier 116, and upon verification of the Identifier 116 and the CSR 118, generating a Certificate 122 based at least in part on the CSR 118 and returning the Certificate 122 to the Browser Extension 104 for installation upon the UD 108.

Moreover, variations of computer system 400 may be adapted to provide the physical elements of one or more components comprising each First System 104, Second System 120, Server System 114, Third System 134, User's Device 108, the switches, routers and such other components as may be desired and appropriate for the methods and systems of providing a Certificate 122 by way of a Browser Extension 104.

Changes may be made in the above methods, systems and structures without departing from the scope hereof. It should thus be noted that the matter contained in the above description and/or shown in the accompanying drawings should be interpreted as illustrative and not in a limiting sense. Indeed many other embodiments are feasible and possible, as will be evident to one of ordinary skill in the art. The claims that follow are not limited by or to the embodiments discussed herein, but are limited solely by their terms and the Doctrine of Equivalents.

What is claimed:

1. A method of providing a digital certificate by way of a browser extension, the method comprising:
   providing a server system having at least one processor adapted to provide web pages to browsers deployed on user devices,
   by the server system, including, in a web page provided to a first user device, at least a pattern and a static identifier associated with the first user, wherein the static identifier is unchanged in different sessions and indicates a request for the certificate;
   by the server system, receiving from a browser extension upon the first user device that has recognized the pattern in the web page provided to the first user device and that has extracted the static identifier from the web page provided to the first user device:
   a certificate request (CSR), and
   the extracted static identifier, and
   by the server system, verifying the identifier and the CSR; and
   by the server system, upon verification of the static identifier and the CSR, generating the certificate based at least in part on the CSR and returning the certificate to the browser extension for installation upon the first user device, the certificate for use with a remote third system.

2. The method of claim 1, wherein the static identifier is a certificate request (CSR).

3. The method of claim 1, wherein the browser extension is autonomous from the browser.

4. The method of claim 1, wherein the browser extension is not an ActiveX component.

5. The method of claim 1, wherein the browser extension is not controlled by the browser.

6. The method of claim 1, wherein the predefined pattern is transparent to a user of the first user device.

7. The method of claim 1, wherein the predefined pattern is not visually apparent to a user of the first user device.

8. The method of claim 1, wherein the static identifier is transparent to a user of the first user device.

9. The method of claim 1, wherein the static identifier is not visually apparent to a user of the first user device.

10. The method of claim 1, wherein the pattern is a one time password.

11. The method of claim 1, wherein the pattern is a session ID.

12. The method of claim 1, wherein the server system generates the certificate directly.

13. The method of claim 1, wherein the server system generates the certificate by proxy to a certificate authority.

14. The method of claim 1, wherein the certificate is a certificate for certificate-based OSI layer 2 and layer 3 access upon a remote third system.

15. The method of claim 1, wherein the certificate is for certificate-based wireless network layer access upon a remote third system.

16. The method of claim 1, wherein the certificate is for automatic certificate-based network layer access to a remote third system.

17. A method of providing a digital certificate by way of a browser extension, the method comprising:
    providing a browser extension from a first system having at least one processor to a user device having at least one processor, the browser extension plugging into a browser application on the user's device and monitoring web sites to which the browser application is directed by the user;
    monitoring web site pages to which the browser application is directed by the user with the browser extension for the presence of at least one predefined pattern included in a monitored web site page provided to the user device, and in response to the presence of the at least one predefined pattern, extracting from the monitored web site page at least a static identifier included in the monitored web site page, wherein the static identifier is associated with a first user, is unchanged in different sessions and indicates a request for the certificate;
    generating a certificate request (CSR) with the browser extension;
    sending the CSR and the static identifier to a remote second system by way of the browser extension, the second system generating the certificate based at least in part on the CSR upon verification of the static identifier and returning the certificate to the user's device; and
    receiving the certificate by the browser extension and installing the certificate upon the user's device, the certificate for use with a remote third system.

18. The method of claim 17, wherein the browser extension is autonomous from the browser application.

19. The method of claim 17, wherein the browser extension is not an ActiveX component.

20. The method of claim 17, wherein the browser extension is not controlled by the browser application.

21. The method of claim 17, wherein the remote second system is providing the web site page with the predefined pattern and the static identifier.

22. The method of claim 17, wherein the predefined pattern is transparent to the user.

23. The method of claim 17, wherein the predefined pattern is not visually apparent to the user.

24. The method of claim 17, wherein the static identifier is transparent to the user.

25. The method of claim 17, wherein the static identifier is not visually apparent to the user.

26. The method of claim 17, wherein the pattern is a one time password.

27. The method of claim 17, wherein the pattern is a session ID.

28. The method of claim 17, wherein the second system generates the certificate directly.

29. The method of claim 17, wherein the second system generates the certificate by proxy to a certificate authority.

30. The method of claim 17, wherein the certificate is a certificate for certificate-based OSI layer 2 and layer 3 access upon a remote third system.

31. The method of claim 17, wherein the certificate is for certificate-based wireless network layer access upon a remote third system.

32. The method of claim 17, wherein the certificate is for automatic certificate-based network layer access to a remote third system.

33. The method of claim 17, wherein the browser extension sends the CSR and the static identifier to the second system by HTTP/HTTPS.

34. The method of claim 17, wherein the first system, the second system, and a third system with which the certificate may be used are distinct systems.

35. The method of claim 17, wherein the predefined pattern is selected from a group consisting of: a URL pattern; a contents pattern of the HTML code providing the page; at least one flag in the HTML; a session identifier attribute in the HTML; and information in http HTTP response headers.

36. The method of claim 17, wherein the certificate has at least one characteristic.

37. The method of claim 17, wherein the predefined pattern and the static identifier extracted by the browser extension of the first user are different from the predefined pattern and the static identifier extracted by the browser extension of a second user such that the certificate provided to the first user is distinct from the certificate provided to the second user.

38. The method of claim 37, wherein the certificate provided to the first user provided different access from the certificate provided to the second user.

39. A system for providing a digital certificate by way of a browser extension, the system comprising:
    a server system having at least one processor adapted to provide web pages to browsers deployed on user devices,
    the server system further adapted to include, in a web page provided to a first user device, at least a pattern and a static identifier associated with the first user, wherein the static identifier is unchanged in different sessions and indicates a request for the certificate;
    the server system further structured and arranged to receive, from a browser extension upon the first user device that has recognized the pattern in the web page provided to the first user device and that has extracted the static identifier from the web page provided to the first user device:
a certificate request (CSR), and
the extracted static identifier; and
the at least one processor further adapted to, upon verification of the static identifier and the CSR, generate the certificate based at least in part on the CSR and to return the certificate to the browser extension for installation upon the first user device, the certificate for use with a remote third system.

40. The system of claim 39, wherein the static identifier is a certificate request (CSR).

41. The system of claim 39, wherein the browser extension is autonomous from the browser.

42. The system of claim 39, wherein the browser extension is not an ActiveX component.

43. The system of claim 39, wherein the browser extension is not controlled by the browser.

44. The system of claim 39, wherein the predefined pattern is transparent to a user of the first user device.

45. The system of claim 39, wherein the predefined pattern is not visually apparent to a user of the first user device.

46. The system of claim 39, wherein the static identifier is transparent to a user of the first user device.

47. The system of claim 39, wherein the static identifier is not visually apparent to a user of the first user device.

48. The system of claim 39, wherein the pattern is a one time password.

49. The system of claim 39, wherein the pattern is a session ID.

50. The system of claim 39, wherein the second system generates the certificate directly.

51. The system of claim 39, wherein the second system generates the certificate by proxy to a certificate authority.

52. The system of claim 39, wherein the certificate is a certificate for certificate-based OSI layer 2 and layer 3 access upon a remote third system.

53. The system of claim 39, wherein the certificate is for certificate-based wireless network layer access upon a remote third system.

54. The system of claim 39, wherein the certificate is for automatic certificate-based network layer access to a remote third system.

* * * * *